(12) United States Patent
Northcutt et al.

(10) Patent No.: US 10,607,079 B2
(45) Date of Patent: Mar. 31, 2020

(54) SYSTEMS AND METHODS FOR GENERATING THREE DIMENSIONAL SKELETON REPRESENTATIONS

(71) Applicant: Toyota Research Institute, Inc., Los Altos, CA (US)

(72) Inventors: Brandon Northcutt, Mountain View, CA (US); Kevin Stone, Palo Alto, CA (US); Konstantine Mushegian, San Francisco, CA (US); Katarina Bouma, Palo Alto, CA (US); Kazuto Murase, Mountain View, CA (US); Akiyoshi Ochiai, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 157 days.

(21) Appl. No.: 15/868,374

(22) Filed: Jan. 11, 2018

(65) Prior Publication Data
US 2019/0095711 A1    Mar. 28, 2019

Related U.S. Application Data

(60) Provisional application No. 62/563,427, filed on Sep. 26, 2017.

(51) Int. Cl.
*G06K 9/00*    (2006.01)
*G06T 7/50*    (2017.01)
(Continued)

(52) U.S. Cl.
CPC ..... *G06K 9/00664* (2013.01); *G06K 9/00348* (2013.01); *G06K 9/00369* (2013.01);
(Continued)

(58) Field of Classification Search
CPC ....... G06T 15/205; G06T 17/00; G06T 17/05; G06T 2207/10028; G06T 2207/30196;
(Continued)

(56) References Cited

U.S. PATENT DOCUMENTS 8,114,172 B2 *  2/2012  Givon .................. G06K 9/3216
                                                      48/49
8,582,867 B2   11/2013  Litvak
(Continued)

OTHER PUBLICATIONS

Association, R. A. (2009). Geometry 2: Rea quick access reference chart. Place of publication not identified: Research & Education Assn. https://books.google.com/books?id=KqblWg0itZEC&lpg=PT1&dq=cone%20basic%20geometry&pg=PT1#v=onepage&q=cone%20basic%20geometry&f=false (Year: 2009).*

(Continued)

*Primary Examiner* — Ross Varndell
(74) *Attorney, Agent, or Firm* — Dinsmore & Shohl LLP

(57) ABSTRACT

Systems, robots, and methods for generating three-dimensional skeleton representations of people are disclosed. A method includes generating, from a two-dimensional image, a two-dimensional skeleton representation of a person present in the two-dimensional image. The two-dimensional skeleton representation includes a plurality of joints and a plurality of links between individual joints of the plurality of joints. The method further includes positioning a cone around one or more links of the plurality of links, and identifying points of a depth cloud that intersect with the cone positioned around the one or more links of the two-dimensional skeleton. The points of the depth cloud are generated by a depth sensor and each point provides depth information. The method also includes projecting the two-dimensional skeleton representation into three-dimensional space using the depth information of the points that intersect (Continued)

with the cone, thereby generating the three-dimensional skeleton representation of the person.

20 Claims, 10 Drawing Sheets

(51) Int. Cl.
*G06T 7/73* (2017.01)
*G06K 9/62* (2006.01)
*G06T 15/20* (2011.01)

(52) U.S. Cl.
CPC ....... *G06K 9/00375* (2013.01); *G06K 9/6202* (2013.01); *G06T 7/50* (2017.01); *G06T 7/73* (2017.01); *G06T 7/75* (2017.01); *G06T 15/205* (2013.01); *G06T 2207/10024* (2013.01); *G06T 2207/10028* (2013.01); *G06T 2207/30196* (2013.01)

(58) Field of Classification Search
CPC ....... G06T 7/251; G06T 13/40; H04N 13/275; G06F 3/017; G06K 9/00362; G06K 9/00342; G06K 9/00664; G06K 9/3216; G06K 2209/40; G06K 9/00201
See application file for complete search history.

(56) References Cited

U.S. PATENT DOCUMENTS

| | | | |
|---|---|---|---|
| 8,922,547 | B2 | 12/2014 | Lim et al. |
| 9,165,199 | B2 | 10/2015 | Zhu et al. |
| 9,275,277 | B2 | 3/2016 | Onen et al. |
| 2004/0082849 | A1* | 4/2004 | Schweikard ............ G06T 15/20 600/424 |
| 2010/0302247 | A1* | 12/2010 | Perez ................. G06K 9/00201 345/440 |
| 2014/0226000 | A1* | 8/2014 | Vilcovsky ............... G06F 3/017 348/77 |
| 2014/0334670 | A1* | 11/2014 | Guigues .................. G06T 7/251 382/103 |
| 2015/0081167 | A1* | 3/2015 | Pisz .................... B60H 1/00642 701/36 |
| 2015/0227783 | A1 | 8/2015 | Gurman et al. |
| 2016/0335790 | A1* | 11/2016 | Fleishman ......... G06K 9/00355 |
| 2019/0008421 | A1* | 1/2019 | Sinha ..................... G06T 7/277 |

OTHER PUBLICATIONS

Ye et al., Accurate 3D Pose Estimation From a Single Depth Image, retrieved from http://vis.uky.edu/~gravity/Research/Mocap/Mocap_files/mocap_iccv2011.pdf, Oct. 23, 2017.

* cited by examiner

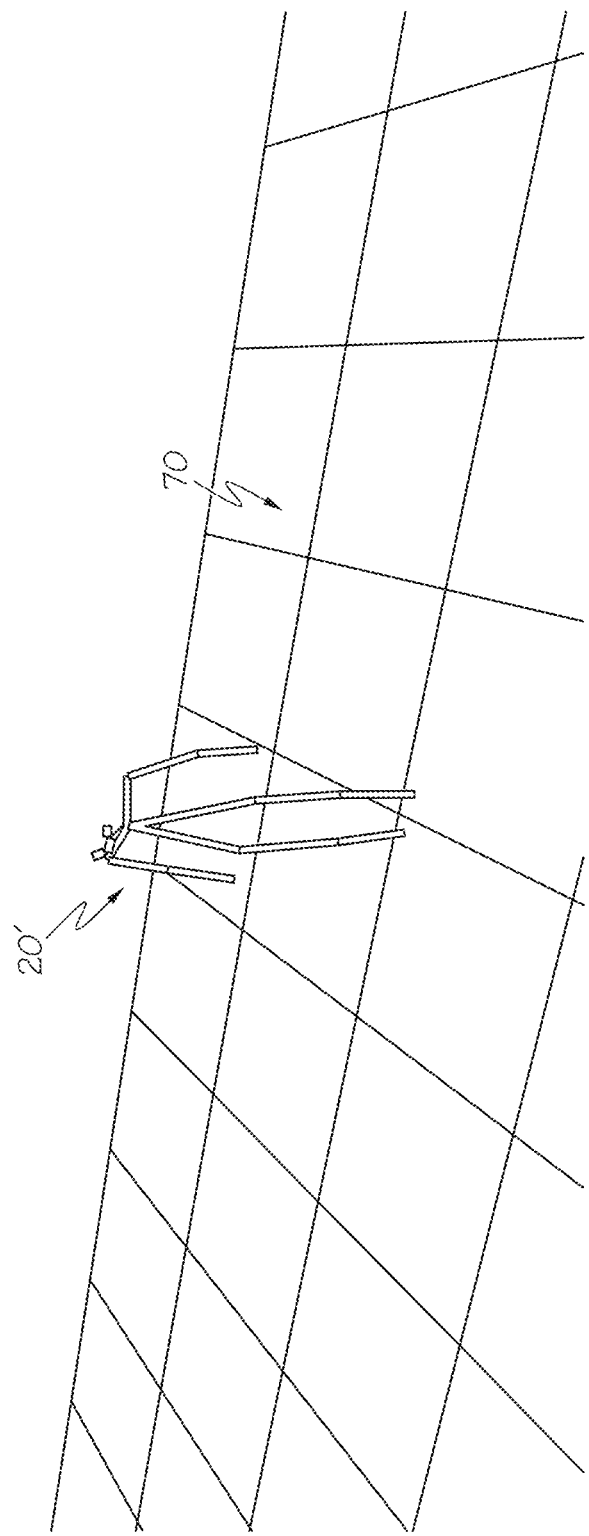

SYSTEMS AND METHODS FOR GENERATING THREE DIMENSIONAL SKELETON REPRESENTATIONS

CROSS-REFERENCE TO RELATED APPLICATION

The present application claims priority to U.S. Provisional Patent Application Ser. No. 62/563,427, filed Sep. 26, 2017 and entitled "SYSTEMS, ROBOTS AND METHODS FOR GENERATING THREE DIMENSIONAL SKELETON REPRESENTATIONS," which is incorporated by reference herein in its entirety.

TECHNICAL FIELD

Embodiments described herein generally relate to object recognition and, more particularly, systems, robots and methods for generating three dimensional skeleton representations of people in an environment.

BACKGROUND

Computer vision may be used to determine the presence of a person in an image. For example, robots may use computer vision to determine the presence of a person in an environment so that the robot may co-habitat a space with people. That is, robots may rely on computer vision to determine a pose, orientation, or the like of a human so as to interact with the human. However, existing systems and methods may not adequately utilize computer vision to accurately estimate a pose, orientation, or the like. In addition, existing computer vision systems may not be able to authenticate a particular human if the human's face is obscured.

SUMMARY

In one embodiment, a method of generating a three-dimensional skeleton representation of a person includes generating, from a two-dimensional image, a two-dimensional skeleton representation of a person present in the two-dimensional image, wherein the two-dimensional skeleton representation comprises a plurality of joints and a plurality of links between individual joints of the plurality of joints. The method further includes positioning a cone around one or more links of the plurality of links, and identifying points of a depth cloud that intersect with the cone positioned around the one or more links of the two-dimensional skeleton, wherein the points of the depth cloud are generated by a depth sensor and each point provides depth information. The method also includes projecting the two-dimensional skeleton representation into three-dimensional space using the depth information of the points of the depth cloud that intersect with the cone positioned around one or more links of the plurality of links, thereby generating the three-dimensional skeleton representation of the person.

In another embodiment, a robot includes a processor and a non-transitory memory device storing machine-readable instructions that, when executed by the processor, cause the processor to generate, from a two-dimensional image, a two-dimensional skeleton representation of a person present in the two-dimensional image, wherein the two-dimensional skeleton representation comprises a plurality of joints and a plurality of links between individual joints of the plurality of joints. The machine-readable instructions further cause the processor to position a cone around one or more links of the plurality of links, and identify points of a depth cloud that intersect with the cone positioned around the one or more links of the two-dimensional skeleton, wherein the points of the depth cloud are generated by a depth sensor and each point provides depth information. The machine-readable instructions also cause the processor to project the two-dimensional skeleton representation into three-dimensional space using the depth information of the points of the depth cloud that intersect with the cone positioned around one or more links of the plurality of links, thereby generating the three-dimensional skeleton representation of the person.

In another embodiment, a system includes a processor and a non-transitory, processor readable storage device. The non-transitory, processor-readable storage device includes one or more machine-readable instructions thereon that, when executed by the processor, cause the processor to generate, from a two-dimensional image, a two-dimensional skeleton representation of a person present in the two-dimensional image, where the two-dimensional skeleton representation comprises a plurality of joints and a plurality of links between individual joints of the plurality of joints. The non-transitory, processor-readable storage device further includes one or more machine-readable instructions thereon that, when executed by the processor, cause the processor to position a cone around one or more links of the plurality of links and identify points of a depth cloud that intersect with the cone positioned around the one or more links of the two-dimensional skeleton, where the points of the depth cloud are generated by a depth sensor and each point provides depth information. The non-transitory, processor-readable storage device also includes one or more machine-readable instructions thereon that, when executed by the processor, cause the processor to project the two-dimensional skeleton representation into three-dimensional space using the depth information of the points of the depth cloud that intersect with the cone positioned around one or more links of the plurality of links, thereby generating the three-dimensional skeleton representation of the person.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 8A graphically depicts an illustrative three-dimensional skeleton displayed on a display according to one or more embodiments shown and described herein;

DETAILED DESCRIPTION

Figure 1:
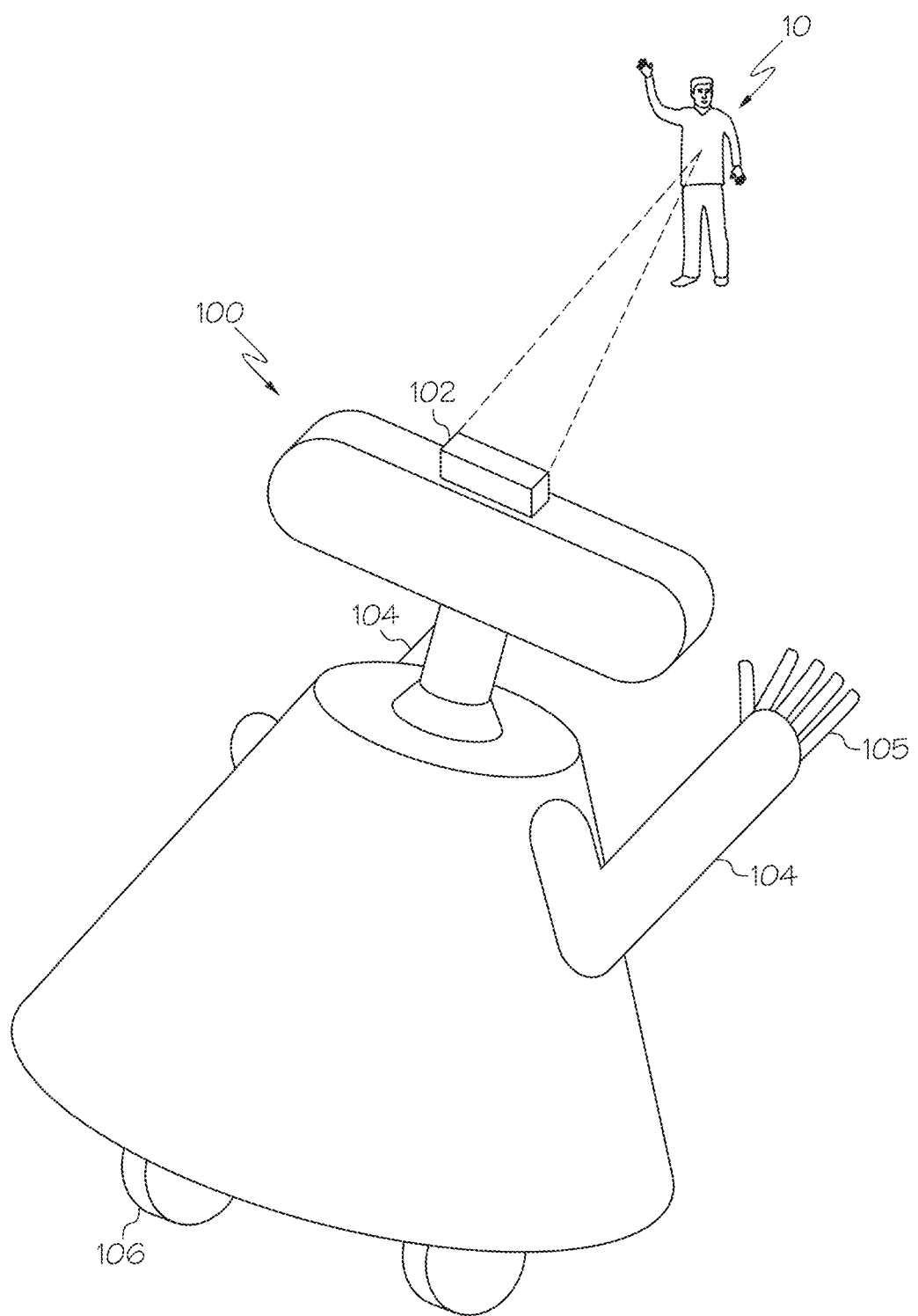
FIG. 1 schematically depicts an illustrative robot according to one or more embodiments described and illustrated herein.

Embodiments disclosed herein are directed to systems and methods for generating three dimensional (3D) skeleton representations of people that include depth information. A 3D skeleton representation may be utilized to determine where a person is located in a 3D space. Further, embodiments enable the detection of a 3D pose estimation of a person in the 3D space. Particularly, a two dimensional (2D) skeleton representation of a person is generated from red-green-blue (RGB) image data. The 2D skeleton representation is then merged with depth information, such as depth information obtained from a depth sensor. As an example and not a limitation, the RGB image data and the depth information may be obtained from an RGB-D camera that creates both 2D RGB images and depth information in a single data package. The result is a 3D skeleton representation of a person providing information regarding a 3D pose of the person as well as the location of the person in 3D space. As an example and not a limitation, the 3D skeleton may be generated using video in real time.

The 3D skeleton representations described herein may be utilized in a wide variety of applications. In one non-limiting application, a robot may use the 3D skeleton representation to determine a location and pose of a person in the environment for the purposes of assisting humans in a variety of tasks. In one example, a robot may be deployed in human occupied spaces, such as homes, special care facilities, and hospitals. These robots may share the same space as humans for purposes such as general assistance and companionship. For example, a robot may be deployed in the home of a person needing physical assistance, such as an elderly person, a handicapped person, or an injured person. The robot may be mobile and may have actuators usable to retrieve objects for the person, for example. Such robots may make the person feel more independent because he or she may utilize the robot to be less reliant on other people for support. Accordingly, embodiments of the present disclosure may assist robots in interacting with people in the environment by determining the location and pose of the people using 3D skeleton representations. It should be understood that, although embodiments are described herein in the context of human-assistive robot applications, embodiments are not limited thereto.

The embodiments described herein may generally be employed on specialized machinery (i.e., robots) that are particularly adapted for carrying out the various processes for imaging an environment and determining whether a human is present, as well as particular characteristics of the human (i.e., pose). However, the present disclosure is not limited to specialized machinery. That is, certain embodiments described herein may be employed on a general computing device communicatively coupled to one or more sensors. In such embodiments, the systems and methods described herein may improve the functionality of the general computing device by providing the general computing device with an ability to more accurately recognize whether a human is present in an environment, how the human is posed, and/or the like, as well as accurately determine an identity of the human, even in instances where a human's face cannot be accurately sensed by the sensors (i.e., because the human is not facing the sensors or the human's face is otherwise obscured).

Referring now to FIG. 1, an illustrative robot, generally designated 100, according to embodiments may be deployed in a human-occupied space, such as, for example, a home. The robot 100 has motorized wheels 106 (or other mobility components such as skis, wings, rotors, continuous tracks, or the like) that are capable of moving the robot throughout the environment, as well as one or more arms 104 having an end effector 105 (e.g., a gripper, a robotic hand, and/or the like) capable of grasping and/or manipulating objects. Additionally, the robot 100 has a plurality of sensors 102 capable of sensing the environment and producing sensor data as a result that assists the robot 100 in detecting objects, manipulating objects, and navigating the environment. The plurality of sensors 102 may include, but is not limited to, cameras (e.g., CCD cameras), infrared sensors, depth sensors, proximity sensors, tactile sensors, Lidar sensors, radar sensors, time of flight sensors, and the like. The plurality of sensors 102 may be capable of generating 2D RGB images as well as depth information. In one example, at least one of the sensors is a RGB-D sensor housed in one package. In another example, the 2D RGB image data and the depth information are generated by separate sensors. It should be understood that the robot 100 shown in FIG. 1 is provided for illustrative purposes only, and that the configuration of the robot is not limited by the present disclosure.

Figure 2:
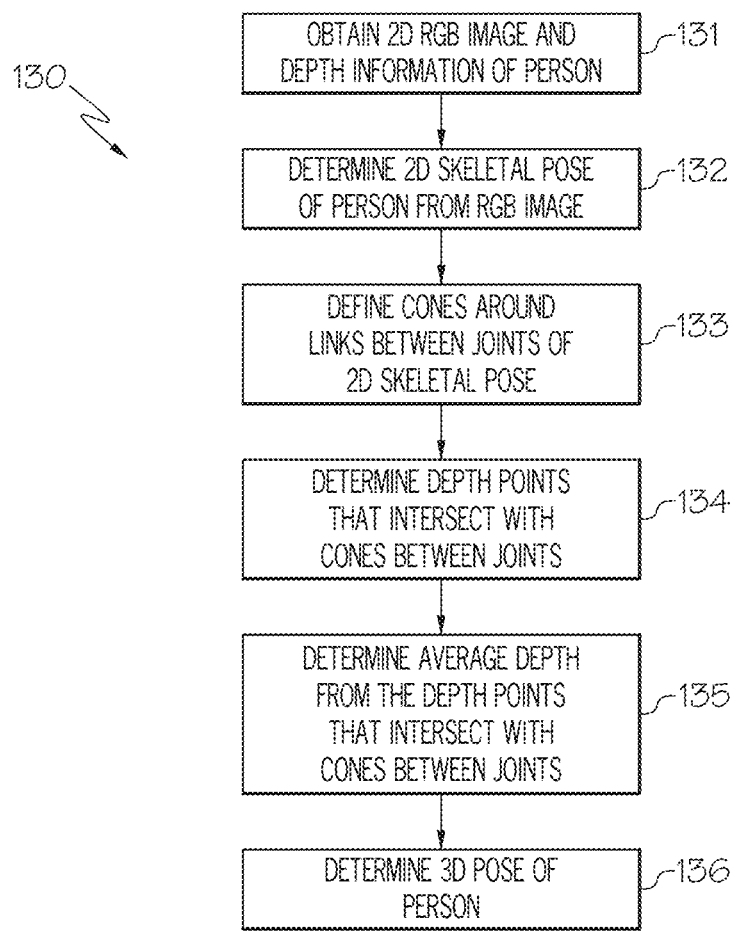
FIG. 2 graphically depicts a flowchart of an illustrative process for generating a three-dimensional skeleton representation of a human according to one or more embodiments described and illustrated herein.
Figure 3:
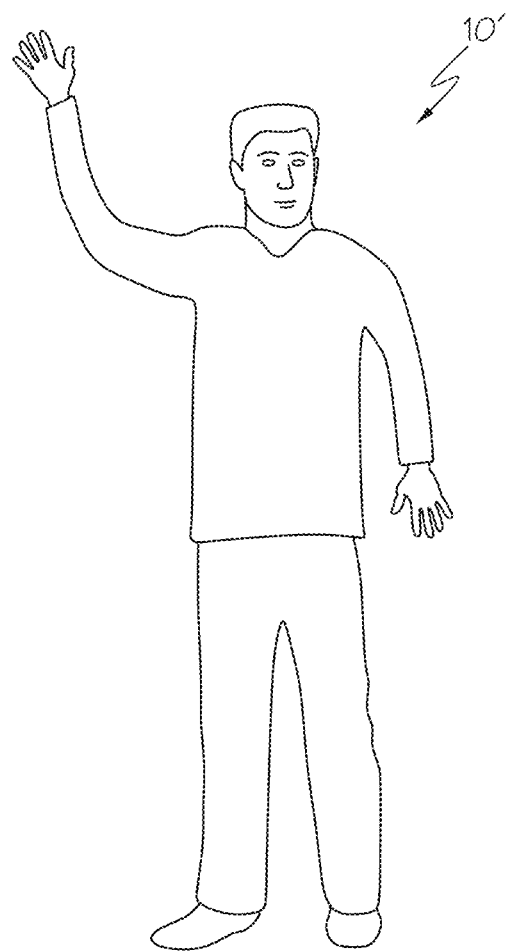
FIG. 3 schematically represents an illustrative two-dimensional image of a person as detected by a sensor according to one or more embodiments described and illustrated herein.

As previously described herein, the robot 100 depicted in FIG. 1 may be particularly configured to develop a 3D skeleton representation of a person. Referring now to FIGS. 1 and 2, a flowchart 130 of an illustrative process for developing a 3D skeleton representation of a person is graphically illustrated. As shown in FIG. 1, the robot 100 (or other computing device) may image a person 10 in the environment. Still referring to FIGS. 1 and 2, sensor(s) 102 produce data regarding the person. That is, an RGB sensor (e.g., a CCD camera) produces a 2D image 10' (FIG. 3) of the person 10, at block 131. In addition, a depth sensor also produces a depth cloud of points within the environment (not shown). The depth sensor and the RGB sensor may be provided in a single sensor 102 as shown in FIG. 1, or in separate sensors.

Figure 4:
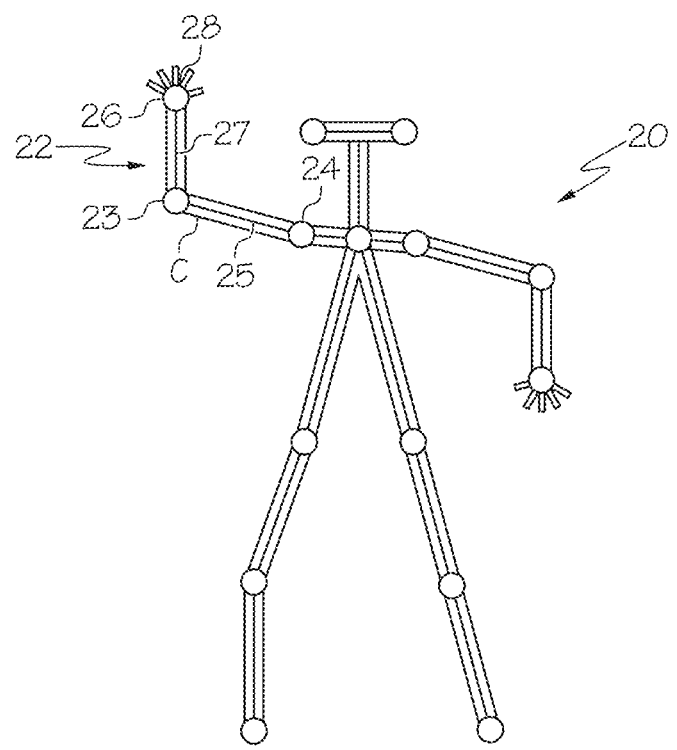
FIG. 4 schematically represents an illustrative two-dimensional skeleton representation of the person in the two-dimensional image of FIG. 3 according to one or more embodiments described and illustrated herein.
Figure 5:
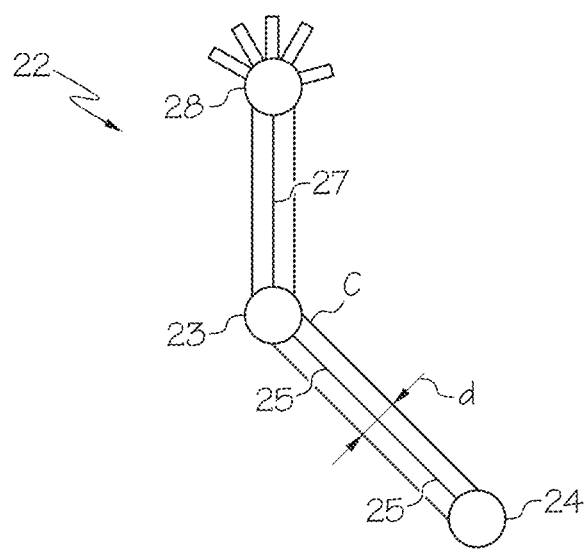
FIG. 5 schematically depicts an illustrative arm portion of the two-dimensional skeleton representation depicted in FIG. 4 according to one or more embodiments described and illustrated herein.

Generally referring to FIGS. 1-5, a 2D skeleton representation 20 of the person 10 is created, an example of which is shown in FIGS. 4 and 5 (block 132 of FIG. 2). FIG. 4 shows a full view of the 2D skeleton representation 20 while FIG. 5 is a partial view depicting the arm 22 of the 2D skeleton representation 20 shown in FIG. 4. Still referring to FIGS. 1-5, the 2D skeleton representation 20 may include a plurality of joints, such as, for example, a shoulder joint 24, an elbow joint 23, and a wrist 26. Other joints not specifically described herein are also contemplated within the 2D skeleton representation 20. A link is provided between joints, such as link 25 between the shoulder joint 24 and the elbow joint 23 (e.g., representing the humerus) and link 27 between the elbow joint 23 and the wrist 26 (e.g., representing the ulna and radius). Any known or yet-to-be-developed method for generating the 2D skeleton representation 20 may be utilized. For example, the 2D skeleton representation may be developed using MATLAB (Mathworks, Natick Mass.) in combination with a Microsoft COCO (Microsoft Corp., Redmond Wash.) dataset, and/or the like.

Next, at block 133 of the flowchart 130 shown in FIG. 2, a cone C having a diameter d is located around each of the links in the 2D skeleton representation 20 as shown in FIGS. 4 and 5. The cone C includes one or more computer-generated ring structures that are positioned around the links such that the links pass through a center of the cone C. The diameter d is generally selected based on an estimated size of the human's body part that corresponds to the link. For example, if the link corresponds to a human's arm, the diameter d of the cone C may be selected to correspond to an estimated diameter of the human's arm. As such, the cone C should generally correspond in size to the respective body part. Accordingly, the diameter d is not limited by this disclosure. As an example and not a limitation, the diameter d may be about three (3) centimeters to about five (5) centimeters. As further described hereinbelow, the cone C is located for the purposes of creating a depth cloud pertaining to the detected person.

Figure 6:
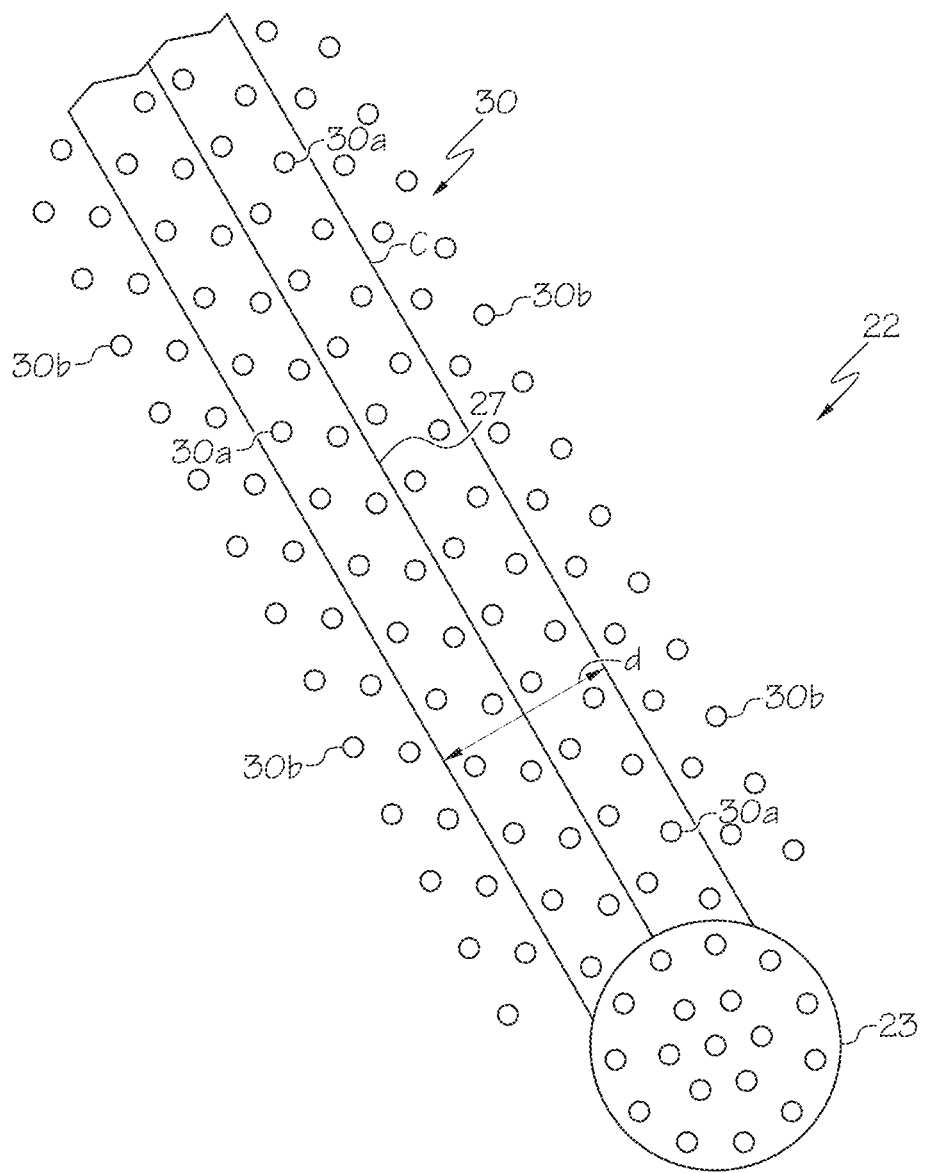
FIG. 6 schematically depicts an illustrative arm portion of the two-dimensional skeleton representation depicted in FIG. 4 with intersecting points of a depth cloud according to one or more embodiments described and illustrated herein.

Referring now to FIG. 6, the 2D skeleton representation 20 having the cones C is merged with the depth information received from the depth sensor. For example, the depth sensor (e.g., sensor 102) creates a depth cloud having a plurality of points 30 in a scene. As an example and not a limitation, the points 30 may be generated by infrared laser beams that are projected by the depth sensor that are projected onto the person 10 (FIG. 1). That is, the depth sensor may emit light (e.g., one or more laser beams) in a direction generally toward the person 10 (FIG. 1). At least a portion of the light is reflected by the person 10 (FIG. 1) and/or objects/people surrounding the person 10. The reflected light is visible by the depth sensor as the points 30.

Referring to FIGS. 2 and 6, depth points that intersect with the cones C are determined at block 134. FIG. 6 shows the projection of the points 30 on the cone C and the other areas surrounding the link 27. More specifically, the points 30 include intersecting points 30a and non-intersecting points 30b. The intersecting points 30a are generally points that intersect with the cone C and the non-intersecting points 30b are generally points that do not intersect with the cone C (i.e., are located outside the cone C). Only the intersecting points 30a that intersect the cones C are considered in the present analysis. For purposes of illustration, FIG. 6 only shows the intersecting points 30a that intersect with the cone C of the arm 22 of the person 10 and a small number of surrounding non-intersecting points 30b. However, it should be understood that there are many additional non-intersecting points 30b outside of the cones C of the 2D skeleton representation 20. Moreover, such non-intersecting points 30b may only be non-intersecting with respect to a particular cone C. That is, a particular point may be a non-intersecting point 30b with respect to the cone C around link 25 (FIG. 5) but may be an intersecting point 30a with respect to the cone C around link 27 (FIG. 5). When a particular point is a non-intersecting point 30b, such points are not considered for the purposes of determining the 2D skeleton representation. Each intersecting point 30a of the depth cloud provides depth information regarding the 2D skeleton representation 20. Particularly, each intersecting point 30a provides a distance from the object it is incident upon to the depth sensor. That is, a distance between the depth sensor and each particular one of the intersecting points 30a can be determined, as described hereinbelow.

Figure 7:
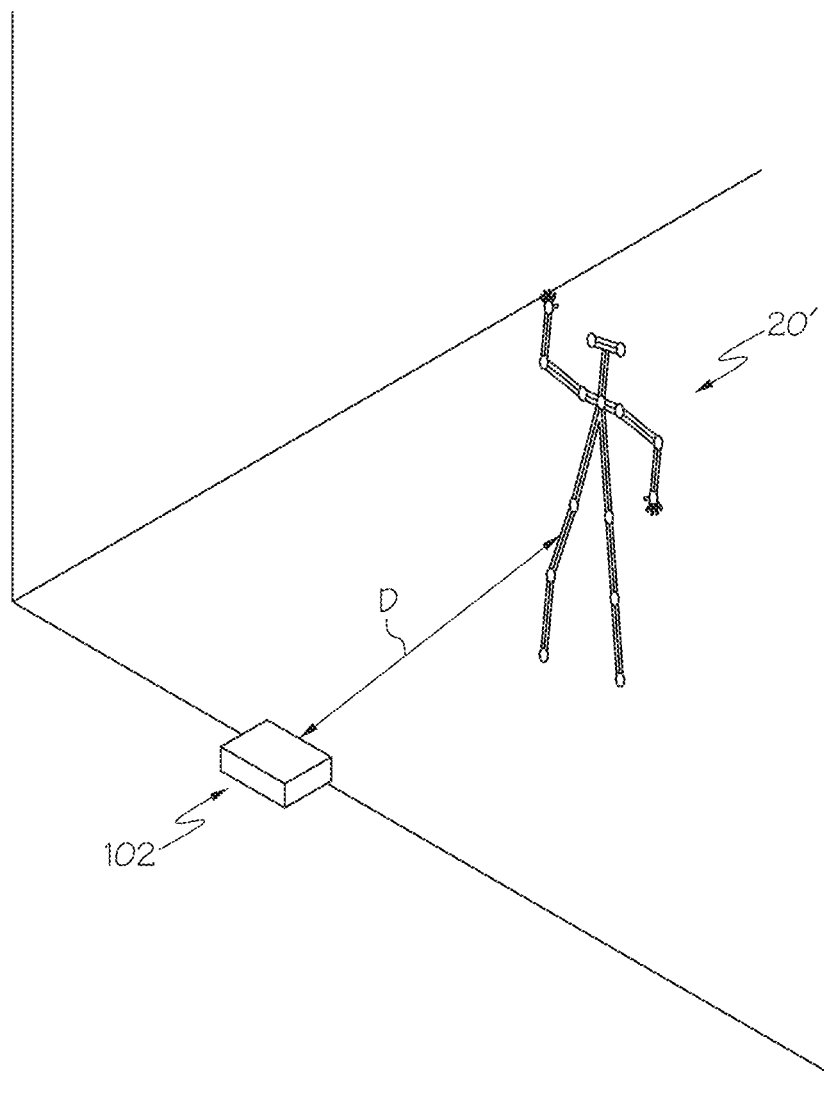
FIG. 7 schematically depicts an illustrative image of a three-dimensional skeleton representation of the person depicted in FIG. 1 in a three-dimensional space according to one or more embodiments described and illustrated herein.

The depth information from the intersecting points 30a is used to determine how far away the 2D skeleton representation 20 is from the depth sensor (e.g., sensor 102 shown in FIG. 1). In one example, an overall average depth is taken from the depth information of all of the intersecting points 30a that intersect with the cones C of the 2D skeleton representation 20 (block 135 of FIG. 2). That is, a depth is calculated for each one of the intersecting points 30a by any method of calculating a distance from a distance sensor, including an angular calculation, a time-of-flight calculation, and/or the like. All of the calculated depths are then averaged together to obtain an overall average depth. FIG. 7 schematically depicts a 3D skeleton representation 20' at a depth D from a sensor 102 based on an overall average of all of the intersecting points 30a that intersect with the cones C of the 2D skeleton representation 20. In another example, the depth is determined individually for particular parts of the 2D skeleton representation 20. For example, a determination may be made as to which of the intersecting points 30a intersect with a person's left arm, then the depth may be determined for each of those intersecting points 30a on the left arm and all of the depth information for the left arm may be averaged to find an average depth for the left arm. Similarly, all of the depth information for the right arm may be averaged to find an average depth for the right arm, all of the depth information for the right leg may be averaged to find an average depth for the right leg, and the like. Further, in some embodiments, the depth of the 2D skeleton representation 20 may be determined in even further granularity, such as small sections of each link of the 2D skeleton representation 20, or even at the intersecting point 30a level depending on the application. It should be understood that other ways of determining depth from the intersecting points 30a that intersect with the cones C of the 2D skeleton representation 20 may be utilized.

Thus, the RGB-D sensor may be utilized to determine a location of a skeleton representation in 3D space. Further, embodiments may also use the 3D skeleton representation 20' to determine a pose of a person (block 136 of FIG. 2). For example, pose estimation may be used to determine which direction a person is facing, a person's posture, where a person's arms are located, how a person's arms are arranged, whether a person or certain body parts thereof are moving, and the like. In a non-limiting example, the pose of the person may generally be used by a robot 100 to coordinate a handoff of an object between the robot 100 and a person so as to ensure that the robot 100 accurately contacts the object, positions the object appropriately for the handoff, and releases the object once the person grasps the object. Using the 3D skeleton representation 20' described herein, the location of a person's hand in 3D space is stored in memory for the robot 100 to access when needed. The robot 100 may also be capable of object recognition such that the robot 100 can locate a particular object held by the person or located adjacent to a person. For example, if a person is holding an apple out to the robot 100 with her right hand, the robot can detect that the user is holding an apple, the location of the apple in 3D space, the orientation of the apple, and/or the like, and use the 3D skeleton representation 20' to locate the person's right hand. The robot 100 may then use this information to determine and execute particular movement commands to cause a natural grasp of the apple from the person's right hand.

Filtering of the 2D skeleton representation 20 or the 3D skeleton representation 20' (collectively "skeleton representations") may also be performed to provide an accurate representation of the person viewed by the sensor 102. For example, historical skeleton representations may be stored in a memory or the like, and rules may be developed that represent valid skeleton representations. For example, links representing arms on the same person may generally be within a certain proportion to one another (e.g., one arm link cannot be significantly larger than the other arm link), the links representing legs should be within a proportional range with respect to the arms, the links of the skeleton representation should provide for a pose that is capable of being performed by a human (e.g., human arms cannot be bent back in a certain way).

When a detected skeleton representation (either a 2D skeleton representation 20 or a 3D skeleton representation 20' including depth information) violates one of the rules based on the historical data (e.g., the arms do not correspond in size or respective location), corrective action may be taken. For example, another measurement may be taken and the incorrect measurement disregarded, or modifications to one or more links may be made to satisfy the one or more rules that were violated. In this manner, skeleton representations may be filtered by applying certain predetermined rules.

In some embodiments, the 3D skeleton representation 20' may also be used to identify a particular person. Facial recognition is a technique that may be used to detect a particular person. However, a person's face is not always clearly in view of a sensor, such as a camera. As such, in a robotics application, the robot 100 may not be programmed to recognize who a person is if the person is not facing the robot or otherwise facing imaging sensors that are accessible to the robot 100. In some embodiments, a database containing information relating to registered users and their respective 3D skeleton representations 20' may be developed. The links and joints of the 3D skeleton representations 20' may provide for a unique identifier of a person, much like a fingerprint. A user may become a registered user by registering several 3D skeleton representations 20' for different poses. The robot 100 (or other computing device) may then develop an identification using various attributes of the of the 3D skeleton representations 20', such as, for example, a length of links between joints, a location of joints, a ratio of a length of one link to another link, and/or the like. Such attributes are generally unique to the registered user. As another example, the robot 100 (or other computing device) may record a user's gait by way of the 3D skeleton representation 20'. That is, a moving image of the person (and thus the 3D skeleton representation 20' thereof) may be recorded so that information regarding gait can be determined and stored. A person's gait provides identifying information regarding that person. Therefore, a person's gait may also be stored in the database for identification purposes.

Accordingly, when imaging a person 10, the robot 100 (or other computing device) may access the database to identify a user in any number of ways. Thus, a user may be identified even when his or her face is not visible. Additionally, known attributes of the identified user's 3D skeleton representation 20' may be applied in real time to correct for any errors that may have occurred with the 3D skeleton representation 20' that is currently being generated (e.g., correct for errors in length of any one link in the skeleton representation, correct for gait, or the like).

Figure 8B:
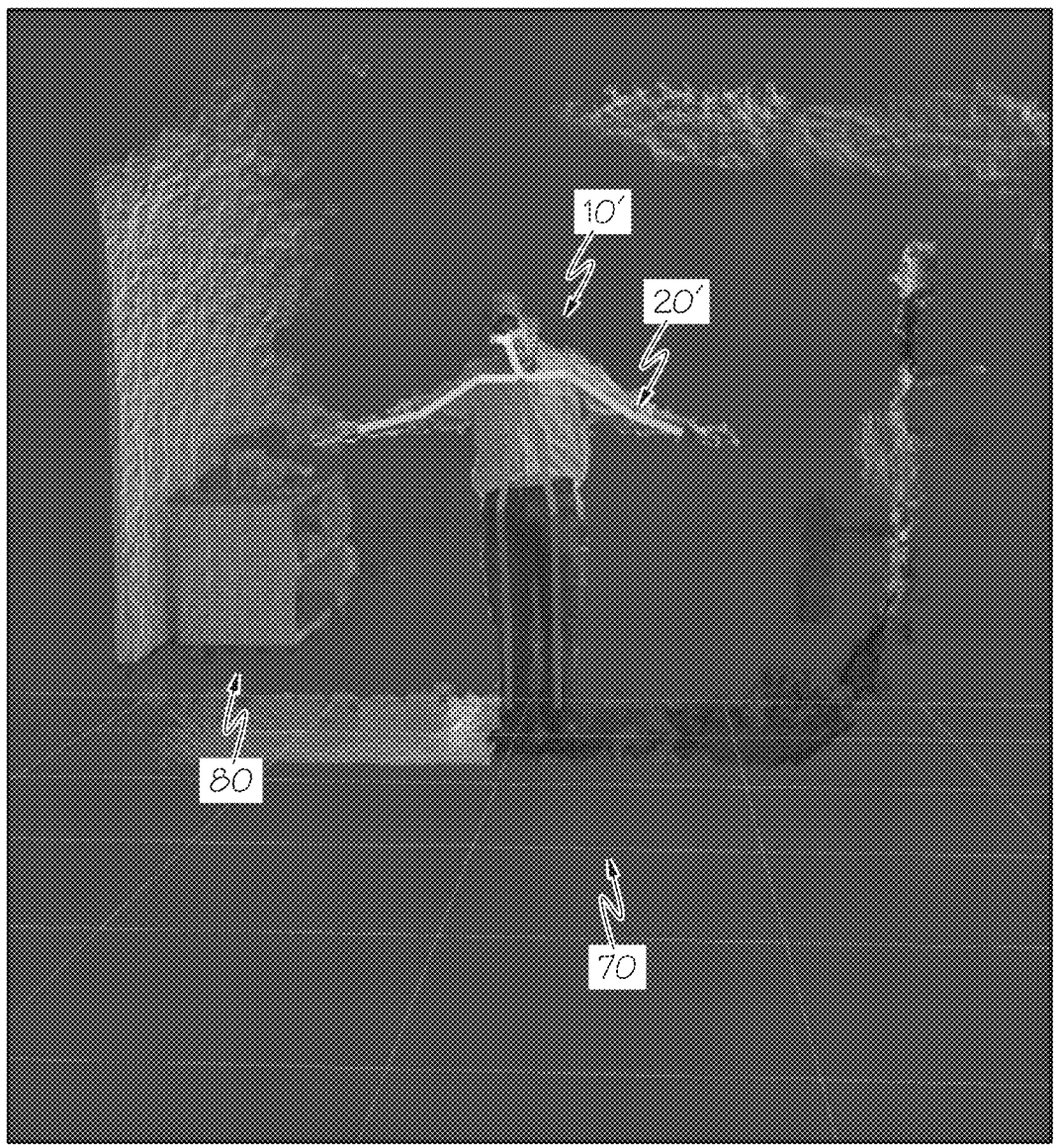
FIG. 8B graphically depicts another illustrative three-dimensional skeleton displayed on a display according to one or more embodiments shown and described herein.
Figure 8C:
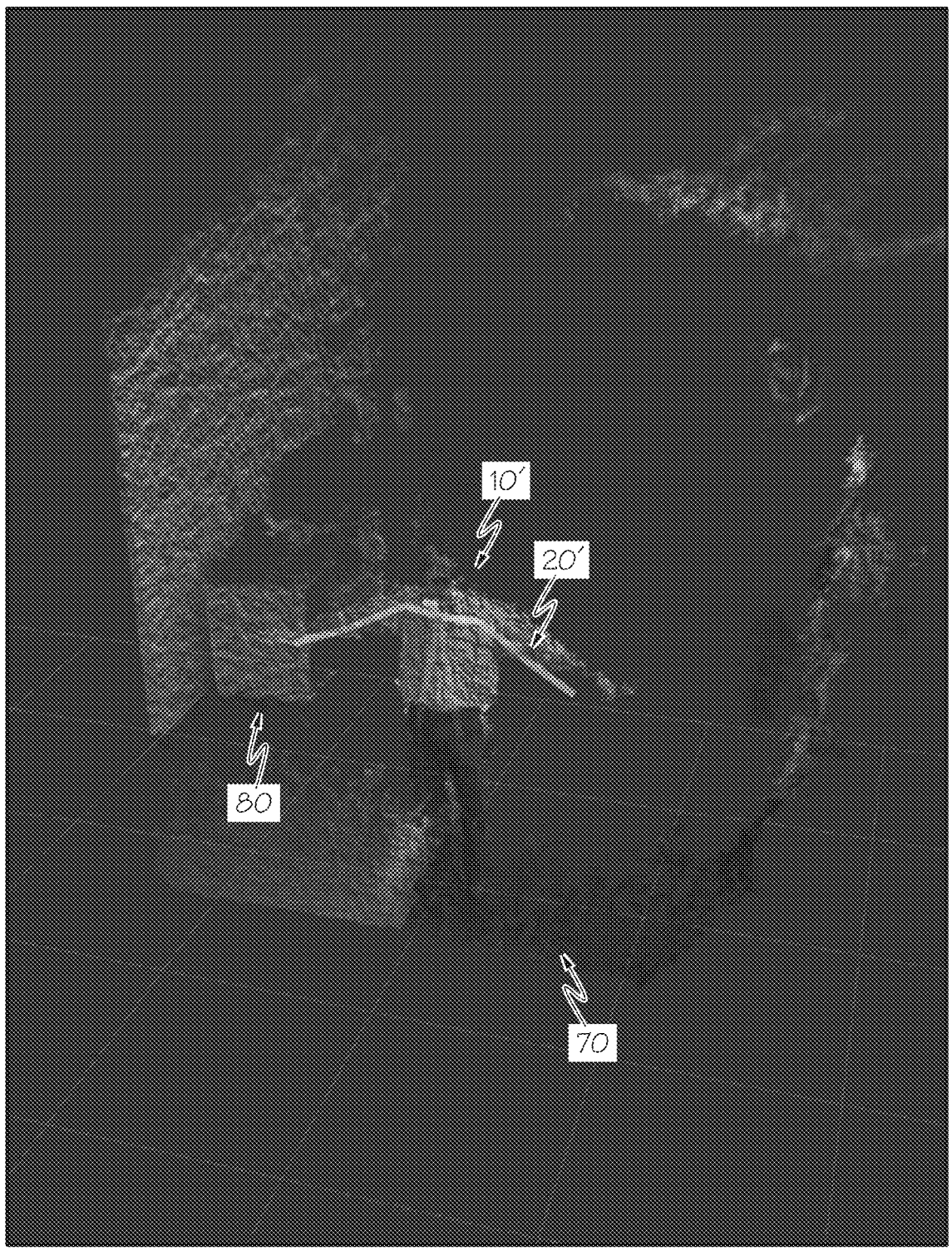
FIG. 8C graphically depicts yet another illustrative three-dimensional skeleton displayed on a display according to one or more embodiments shown and described herein.

FIGS. 8A-8C are example images of 3D skeleton representations 20' that may be displayed or otherwise used by a robot or a computing device for any number of applications. More specifically, FIG. 8A depicts the 3D skeleton representation 20' of a particular user in a 3D space 70. FIGS. 8B and 8C depict the 3D skeleton representation 20' superimposed over the 3D image of the person 10' in the 3D space 70. As shown in FIGS. 8B and 8C, the shape, size, and arrangement of the 3D skeleton representation 20' corresponds to the shape, size, and arrangement of the person 10'. Other objects 80 (such as furniture, target objects, and/or the like) that are present in the 3D space 70 are determined to not be part of the person 10' and thus are ignored by the robot 100 (FIG. 1).

Figure 9:
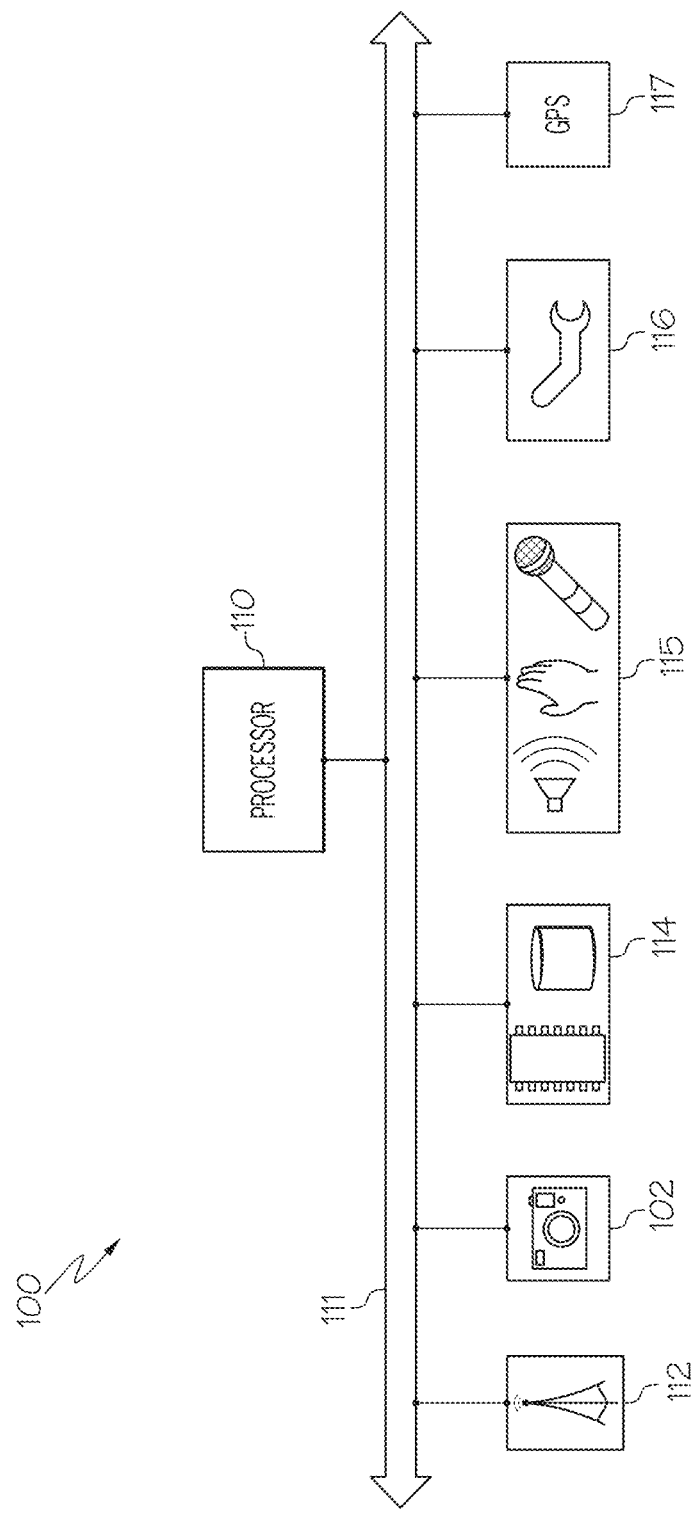
FIG. 9 schematically depicts components of an illustrative robot according to one or more embodiments described and illustrated herein.

Referring now to FIG. 9, components of a robot 100 are schematically depicted. As noted above, the 3D skeleton representation 20' functionalities described herein are not limited to robotic applications, and may be performed using one or more sensors 102 and a computing device. It should also be understood that the robot 100 may include more components and/or alternative components than are illustrated by FIG. 9, and that FIG. 9 is provided for illustrative purposes only. The robot 100 generally includes a processor 110, a communication path 111, network interface hardware 112, a plurality of sensors 102, one or more memory modules 114, a plurality of inputs and outputs 115, a plurality of actuators 116, and a location sensor 117.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 includes a combination of conductive traces, conductive wires, connectors, and buses that cooperate to permit the transmission of electrical data signals to components such as processors, memories, sensors, input devices, output devices, and communication devices. Accordingly, the communication path 111 may be a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and/or the like.

The processor 110 of the robot 100 may be any device capable of executing machine-readable instructions including, but not limited to, machine-readable instructions for generating 3D skeleton representations 20' of people as described herein. Accordingly, the processor 110 may be a controller, an integrated circuit, a microchip, a computer, or any other computing device. The processor 110 is communicatively coupled to the other components of the robot 100 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data. While the embodiment depicted in FIG. 9 includes a single processor 110, other embodiments may include more than one processor, including a plurality of dedicated processors that are each configured to complete a particular task or set of tasks.

The network interface hardware 112 is coupled to the communication path 111 and communicatively coupled to the processor 110. The network interface hardware 112 may be any device capable of transmitting and/or receiving data via a network. Accordingly, the network interface hardware 112 can include a wireless communication module configured as a communication transceiver for sending and/or receiving any wired or wireless communication. For example, the network interface hardware 112 may include an antenna, a modem, a LAN port, a Wi-Fi card, a WiMax card, an LTE card, mobile communications hardware, near-field communications hardware, satellite communications hardware, and/or any wired or wireless hardware for communicating with other networks and/or devices. In one embodiment, the network interface hardware 112 may include hardware configured to operate in accordance with a wireless communication protocol, such as, for example, Bluetooth, an 802.11 standard, Zigbee, Z-wave, and the like. For example, the network interface hardware 112 may include a Bluetooth send/receive module for sending and receiving Bluetooth communications to/from a portable electronic device. The network interface hardware 112 may also include a radio frequency identification ("RFID") reader configured to interrogate and read RFID tags. The network interface hardware 112 may be configured to transmit the 3D skeleton representations 20' to other electronics devices, such as connected mobile devices, displays and other devices to display or otherwise utilize the 3D skeleton representations 20'.

The plurality of sensors 102 may be communicatively coupled to the processor 110. The plurality of sensors 102 may include the RGB and depth sensors described herein, as well as any type of sensors capable of providing the robot 100) with information regarding the environment. The plurality of sensors may include, but is not limited to, cameras (e.g., RGB CCD cameras), infrared sensors, depth sensors, proximity sensors, tactile sensors, Lidar sensors, radar sensors, time of flight sensors, inertial measurement units (e.g., one or more accelerometers and gyroscopes), and/or the like. Data from the sensors 102 are used to develop 3D skeleton representations 20', as described herein.

The memory module 114 of the robot 100 is coupled to the communication path 111 and communicatively coupled to the processor 110. The memory module 114 may comprise RAM, ROM, flash memories, hard drives, or any non-transitory memory device capable of storing machine-readable instructions such that the machine-readable instructions can be accessed and executed by the processor 110. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, and the like, that may be compiled or assembled into machine-readable instructions and stored in the memory module 114. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 9 includes a single memory module 114, other embodiments may include more than one memory module. The memory module 114 may also store sensor data as described herein.

The memory module 114 stores the machine-readable instructions capable of being executed by the processor to perform the various functionalities described herein. The memory module 114 also may store the database of registered 3D skeleton representations 20' for user identification purposes as described herein. Other data for generating 3D skeleton representations 20' and other functionalities described herein may also be stored in the memory module 114. Further, in some embodiments, data for generating and storing the 3D skeleton representations 20' may be stored remotely, such as on a remote server (not shown).

The input and output devices 115 may include any number of input devices and output devices. Illustrative input devices include, but are not limited to, keyboards, buttons, switches, knobs, touchpads, touch screens, microphones, infrared gesture sensors, mouse devices, and the like. Illustrative output devices include, but are not limited to, speakers, electronic displays, lights, light emitting diodes, buzzers, tactile displays, and the like.

The plurality of actuators 116 may include, for example, mechanical actuators that enable the robot to navigate a space and/or manipulate objects. In some embodiments, the actuators 116 may include motorized wheel assemblies and/or other mobility devices (wings, propellers, rotors, skis, continuous tracks, etc.) that cause the robot to move within a space. Actuators may also include motors or the like that are controllable to move the arms 104 and the end effectors 105 of the robot 100 to grasp and manipulate objects.

The location sensor 117 is coupled to the communication path 111 and communicatively coupled to the processor 110. The location sensor 117 may be any device capable of generating an output indicative of a location. In some embodiments, the location sensor 117 includes a global positioning system (GPS) sensor, though embodiments are not limited thereto. In some embodiments, the location sensor 117 may be integrated within the network interface hardware 112 such that the location can be at least partially determined from signals sent and received with the network interface hardware (e.g., use of wifi signal strength to determine distance). Some embodiments may not include the location sensor 117, such as embodiments in which the robot 100 does not determine its location or embodiments in which the location is determined in other ways (e.g., based on information received from other equipment). The location sensor 117 may also be configured as a wireless signal sensor capable of triangulating a location of the robot 100) and the user by way of wireless signals received from one or more wireless signal antennas.

It should be understood that the robot 100 may include other components not depicted in FIG. 9. For example, the robot 100 may be powered by a battery. The battery may be any device capable of storing electric energy for later use by the robot 100. In some embodiments, the battery is a rechargeable battery, such as a lithium-ion battery or a nickel-cadmium battery. In embodiments in which the battery is a rechargeable battery, the robot 100 may include the charging port, which may be used to charge the battery.

It should now be understood that embodiments of the present disclosure are configured to generate 3D skeleton representations 20' of people within an environment. In one example a robot includes one or more sensors to generate a 3D skeleton representation 20' of a person to understand where the person is located in 3D space, to assist in path planning and grasp pattern development, person identification, user authentication, and other functionalities. The 3D skeleton representations 20' described herein are created by generating a 2D skeleton representation 20 from a 2D RGB image. The 2D skeleton representation 20 is projected into 3D space using depth information from a depth sensor. The RGB sensor and the depth sensor may be separate sensors, or one sensor in a single package.

As a result of the embodiments of the present disclosure, the functionality of the systems that are used to execute the processes described herein is improved because the embodiments described herein allow such systems to more accurately sense the presence of humans in a space, as well as their movement, their poses, and the like. In addition, the systems described herein have improved functionality because such systems are able to authenticate humans without a view of a human's face.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of generating a three-dimensional skeleton representation of a person and recording gait information, the method comprising:
    generating, from a two-dimensional image, a two-dimensional skeleton representation of a person present in the two-dimensional image, wherein the two-dimensional skeleton representation comprises a plurality of joints and a plurality of links between individual joints of the plurality of joints;
    positioning one or more ring structures around one or more links of the plurality of links such that the one or more links pass through a center of the one or more ring structures;
    identifying points of a depth cloud that intersect with the one or more ring structures positioned around the one or more links of the plurality of links, wherein the points of the depth cloud are generated by a depth sensor and each point provides depth information;
    projecting the two-dimensional skeleton representation into three-dimensional space using the depth information of the points of the depth cloud that intersect with the one or more ring structures positioned around the one or more links of the plurality of links, thereby generating the three-dimensional skeleton representation of the person; and
    recording gait information from the three-dimensional skeleton representation.

2. The method of claim 1, wherein projecting the two-dimensional skeleton representation into three-dimensional space comprises averaging the depth information of all of the points of the depth cloud that intersect with the one or more ring structures positioned around the one or more links of the plurality of links.

3. The method of claim 1, further comprising authenticating a user based at least in part on the three-dimensional skeleton representation.

4. The method of claim 3, wherein authenticating the user comprises:
    obtaining a pose of the user from the three-dimensional skeleton representation;
    accessing a memory comprising a plurality of stored poses for a plurality of registered users; and
    matching the pose of the user with one of the plurality of stored poses.

5. The method of claim 1, further comprising obtaining image data from one or more sensors, wherein the image data comprises the two-dimensional image.

6. The method of claim 1, wherein the one or more ring structures are shaped and sized to correspond to one or more body parts of the person.

7. The method of claim 1, further comprising authenticating a user based at least in part on the gait information.

8. The method of claim 7, wherein authenticating the user comprises:
    accessing a memory comprising a plurality of stored gaits for a plurality of registered users; and
    matching the gait information with one of the plurality of stored gaits.

9. A robot comprising:
    a processor and a non-transitory memory device storing machine-readable instructions that, when executed by the processor, cause the processor to:
        generate, from a two-dimensional image, a two-dimensional skeleton representation of a person present in the two-dimensional image, wherein the two-dimensional skeleton representation comprises a plurality of joints and a plurality of links between individual joints of the plurality of joints;
        position one or more ring structures around one or more links of the plurality of links such that the one or more links pass through a center of the one or more ring structures;
        identify points of a depth cloud that intersect with the one or more ring structures positioned around the one or more links of the plurality of links, wherein the points of the depth cloud are generated by a depth sensor and each point provides depth information;
        project the two-dimensional skeleton representation into three-dimensional space using the depth information of the points of the depth cloud that intersect with the one or more ring structures positioned around the one or more links of the plurality of links, thereby generating a three-dimensional skeleton representation of the person; and
        record gait information from the three-dimensional skeleton representation.

10. The robot of claim 9, wherein projecting the two-dimensional skeleton representation into three-dimensional space comprises averaging the depth information of all of the points of the depth cloud that intersect with the one or more ring structures positioned around the one or more links.

11. The robot of claim 9, wherein the machine-readable instructions further cause the processor to authenticate a user based at least in part on the three-dimensional skeleton representation.

12. The robot of claim 11, wherein the machine-readable instructions that cause the processor to authenticate the user further cause the processor to:

obtain a pose of the user from the three-dimensional skeleton representation;

access a memory comprising a plurality of stored poses for a plurality of registered users; and match the pose of the user with one of the plurality of stored poses.

13. The robot of claim 9, further comprising an arm and end effector positioned at an end of the arm, wherein the machine-readable instructions further cause the processor to:

determine an object held in a hand of the person, and determine a location of the hand of the person in three-dimensional space from the three-dimensional skeleton representation of the person.

14. The robot of claim 13, wherein the machine-readable instructions further cause the arm and end effector to move toward the hand of the person and grasp the object.

15. The robot of claim 13, further comprising a plurality of sensors communicatively coupled to the processor, wherein the plurality of sensors provide the two-dimensional image.

16. A system comprising:

a processor; and a non-transitory, processor-readable storage device, the non-transitory, processor-readable storage device comprising one or more machine-readable instructions thereon that, when executed by the processor, cause the processor to:

generate, from a two-dimensional image, a two-dimensional skeleton representation of a person present in the two-dimensional image, wherein the two-dimensional skeleton representation comprises a plurality of joints and a plurality of links between individual joints of the plurality of joints;

position one or more ring structures around one or more links of the plurality of links such that the one or more links pass through a center of the one or more ring structures;

identify points of a depth cloud that intersect with the one or more ring structures positioned around the one or more links of the plurality of links, wherein the points of the depth cloud are generated by a depth sensor and each point provides depth information;

project the two-dimensional skeleton representation into three-dimensional space using the depth information of the points of the depth cloud that intersect with the one or more ring structures positioned around the one or more links of the plurality of links, thereby generating a three-dimensional skeleton representation of the person; and record gait information from the three-dimensional skeleton representation.

17. The system of claim 16, wherein the one or more machine-readable instructions that cause the processor to project the two-dimensional skeleton representation into three-dimensional space further causes the processor to average the depth information of all of the points of the depth cloud that intersect with the one or more ring structures positioned around the one or more links of the plurality of links.

18. The system of claim 16, wherein the one or more machine-readable instructions further cause the processor to authenticate a user based at least in part on the three-dimensional skeleton representation.

19. The system of claim 16, wherein the machine-readable instructions further cause the processor to:

determine an object held in a hand of the person; and determine a location of the hand of the person in three-dimensional space from the three-dimensional skeleton representation of the person.

20. The system of claim 16, further comprising a plurality of sensors communicatively coupled to the processor, wherein the plurality of sensors provide the two-dimensional image.

* * * * *

UNITED STATES PATENT AND TRADEMARK OFFICE
CERTIFICATE OF CORRECTION

PATENT NO. : 10,607,079 B2
APPLICATION NO. : 15/868374
DATED : March 31, 2020
INVENTOR(S) : Brandon Northcutt et al.

It is certified that error appears in the above-identified patent and that said Letters Patent is hereby corrected as shown below:

In the Specification

In Column 7, Line 50 & 51, after "attributes", delete "of the of the" and insert --of the--, therefor.

Signed and Sealed this
Ninth Day of June, 2020

Andrei Iancu
*Director of the United States Patent and Trademark Office*